United States Patent [19]

Wingler et al.

[11] Patent Number: 4,703,097

[45] Date of Patent: Oct. 27, 1987

[54] OPTICAL CONTACT OBJECTS

[75] Inventors: Frank Wingler, Leverkusen; Otto-Christian Geyer, Wetzlar, both of Fed. Rep. of Germany

[73] Assignee: Bayer Aktiengesellschaft, Leverkusen, Fed. Rep. of Germany

[21] Appl. No.: 31,855

[22] Filed: Mar. 30, 1987

[30] Foreign Application Priority Data

Apr. 10, 1986 [DE] Fed. Rep. of Germany ....... 3612015
Mar. 14, 1987 [DE] Fed. Rep. of Germany ....... 3708308

[51] Int. Cl.$^4$ ........................................... C08F 220/26
[52] U.S. Cl. ................................... 526/279; 523/107; 526/307.1
[58] Field of Search ............................ 526/279, 307.1; 523/107

[56] References Cited

U.S. PATENT DOCUMENTS 4,152,508  5/1979  Ellis ....................... 526/279
4,602,074  7/1986  Mizutani ............... 526/279
4,640,941  2/1987  Park ....................... 526/279

FOREIGN PATENT DOCUMENTS 1082016  9/1967  United Kingdom .

Primary Examiner—Paul R. Michl
Attorney, Agent, or Firm—Connolly and Hutz

[57] ABSTRACT

The optical contact objects contain a wettable, optionally crosslinked copolymer comprising the components N-vinylcarboxamide, (meth)acrylates of a polysiloxane and, optionally, vinyl monomers.

13 Claims, No Drawings

OPTICAL CONTACT OBJECTS

The invention relates to optical contact objects which consists of a wettable, optionally crosslinked copolymer which contains as components N-vinylcarboxamide, a (meth)acrylate of a polysiloxane or a mixture thereof and, optionally, a vinyl monomer, and a process for the production thereof.

In the context of the present invention, optical contact objects are preferably contact lenses and scleral lenses.

BACKGROUND OF THE INVENTION

Contact lenses made of copolymers of polysiloxane methacrylates, alkyl acrylates or methacrylates or itaconates, hydrophilic monomers such as N-vinylpyrrolidone, hydroxyethyl methacrylate, (meth)acrylamide, diacetone acrylamide and, if appropriate, monomers which have a crosslinking effect, such as, for example, ethylene glycol dimethacrylate, are known (U.S. Pat. No. 3,808,178, U.S. Pat. No. 4,216,303, DE-A 2,363,627, WO 83/017,777, P. Rosenthal, CONTACT LENS FORUM; August 1982, pp. 47-57 and T. R. Williams, M. D. Nave, Polym. Mater. Sci. Eng. 52, pp. 279-283 (1985)). However, the poor surface wettability of the contact lenses is a disadvantage. Attempts are made to compensate for this disadvantage by subsequent hydrophilization of the surface, for example, by corona discharge or plasma treatment. However, the hydrophilization layer is not stable for long periods. After relatively long wear periods, the contact lenses losse their wettability land thus their compatibility.

BRIEF DESCRIPTION OF THE INVENTION

Optical contact objects made from wettable, optionally crosslinked, copolymers of olefinically unsaturated monomers have now been found which are characterized in that the copolymer contains as components (A) 4 to 55 parts by weight of an N-vinylcarboxamide of the formula

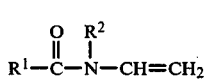  (I)

in which $R^1$ and $R^2$ are identical or different and denote hydrogen or lower alkyl, (B) 96 to 30 parts by weight of a (meth)acrylate or (meth)acrylates of a polysiloxane, and optionally, (C) up to 66 parts by weight of a vinyl monomer.

DETAILED DESCRIPTION OF THE INVENTION

Surprisingly, the optical contact objects according to the invention display high oxygen permeability and good wettability, and exhibit low affinity for lipoid deposition, even after relatively long wear periods.

Monomers for component (A) are N-vinylcarboxamides of the formula (I).

In this formula, lower alkyl generally denotes a straight-chain or branched hydrocarbon radical having 1 to about 6 carbon atoms. Examples which may be mentioned are methyl, ethyl, propyl, isopropyl, butyl, isobutyl, pentyl, isopentyl, hexyl and isohexyl.

The N-vinylcarboxamides are known per se (J. P. Fischer and S. Rosinger, Makromol. Chem. 184, pp. 1247-1254 (1983) and R. W. Stackman, R. H. Summerville, Ind. Eng. chem. Prod. Res. Dev. 24, No. 2, pp. 242-246 (1985)), and may be prepared, for example, by reaction of carboxamides with acetylene.

It is also possible to use mixtures of the N-vinylcarboxamides according to the invention.

The preferred N-vinylcarboxamide is N-methyl-N-vinyl-acetamide.

The optical contact objects according to the invention generally contain 4 to 55 parts by weight, preferably 5 to 15 parts by weight, of N-vinylcarboxamides. Monomers for component (B) are (meth)acrylates of a polysiloxane.

(Meth)acrylates of a polysiloxane may be, for example:

1. compounds of the formula

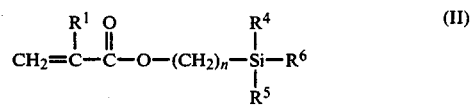  (II)

in which n represents a number from 1 to 4, $R^3$ denotes hydrogen or methyl, and $R^4$, $R^5$ and $R^6$ are identical of different and denote alkoxyl, lower alkyl, cycloalkyl, aryl, trimethylsiloxyl or polysiloxane, 2. compounds of the formula

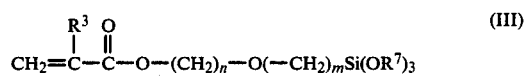  (III)

in which n and m are identical or different and each represent a number from 1 to 4, $R^3$ denotes hydrogen or methyl, and $R^7$ denotes lower alkyl, cycloalkyl or polysiloxane, 3. compounds of the formula

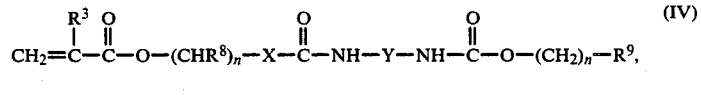  (IV)

in which n represents a number from 1 to 4, $R^3$ denotes hydrogen or methyl, $R^8$ denotes hydrogen, lower alkyl or hydroxyl, $R^9$ represents polysiloxane, X denotes oxygen, sulphur or the radical

in which $R^8$ has the above mentioned meaning, and

Y represents a divalent $C_2$- to $C_{24}$-alkylene, $C_5$- to $C_9$-cycloalkylene or $C_6$- to $C_{12}$-arylene radical or a divalent radical having 7 to 20 carbon atoms consisting of alkylene, cycloalkylene and/or arylene groups, and 4. compounds of the formula

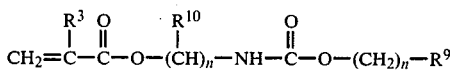 (V)

in which n represents a number from 1 to 6,
$R^3$ denotes hydrogen or methyl,
$R^9$ represents polysiloxane, and
$R^{10}$ represents a hydrogen, lower alkyl or cycloalkyl.

Lower alkyl where used above, generally denotes a straight-chain or branched hydrocarbon radical having 1 to about 6 carbon atoms. Examples which may be mentioned are methyl, ethyl, propyl, isopropyl, butyl, isobutyl, pentyl, isopentyl, hexyl and isohexyl. Preferred lower alkyl radicals are methyl and ethyl.

Cycloalkyl where used above, generally denotes a cyclic hydrocarbon radical having 5 to 9 cabon atoms. Examples which may be mentioned are cyclopentyl, cyclohexyl, cycloheptyl and cyclooctyl. Cyclopentyl and cyclohexyl are preferred.

Alkoxyl where used above, generally denotes a straight-chain or branched hydrocarbon radical which has 1 to about 8 carbon atoms and is linked via oxygen. Lower alkoxyl with 1 to about 6 carbon atoms is preferred. Examples which may be mentioned are methoxy, ethoxy, propoxy, isopropoxy, butoxy, isobutoxy, pentoxy, isopentoxy, hexoxy and isohexoxy. Methoxy and ethoxy are preferred.

Aryl where used above, generally denotes an aromatic hydrocarbon radical having 6 to 12 carbon atoms. Examples which may be mentioned are phenyl, naphthyl and biphenyl. The preferred aryl radical is phenyl.

$C_2$- to $C_{24}$-alkylene generally denotes a divalent straight-chain or branched hydrocarbon chain. Alkylene radicals having 6 to 9 carbon atoms are preferred. Examples which may be mentioned are the following $C_2$- to $C_{24}$-alkylene radicals: methylene, propylene, trimethylene, tetramethylene, pentamethylene, 2,2-dimethyltrimethylene, hexamethylene and 2,2,4-trimethylhexamethylen. Hexamethylene and 2,2,4-trimethylhexamethylene are particularly preferred.

$C_5$- to $C_9$-cycloalkylene where used above, generally denotes a divalent cyclic hydrocarbon radical. $C_5$- and $C_6$-alkylene radicals are preferred. Examples which may be mentioned are the following $C_5$- to $C_9$-cycloalkylene radicals: 1,4-cyclohexylene, 2-methyl-1,4-cyclohexylene and 5-methylene-3,3,5-trimethyl-cyclohex-1-yl.

$C_6$- to $C_{12}$-arylene generally denotes a divalent aromatic hydrocarbon radical. The phenylene, naphthylene and biphenylene radicals are preferred.

Methylene-di-p-phenylene and 2,2-propylene-di-p-phenylene may be mentioned as divalent radicals having alkylene, cycloalkylene and/or arylene groups having 7 to 20 carbon atoms.

Polysiloxane generally denotes polysiloxanes, of preferred branched structure, which have an average molecular weight of from 74 to 10,000 and mainly contain the following structural units:

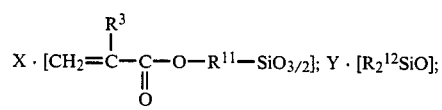

-continued

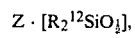

$R^3$ denotes hydrogen or methyl,
$R^{11}$ denotes a divalent, $C_1$- to $C_{15}$-alkylene radical,
$R^{12}$ denotes a monovalent, lower alkyl, aryl- or cycloalkyl radical, the factors X, Y and Z being determined as follows:

$X+Y+Z=1$, $0<X<0.8$ $0<Y<0.8$ $0<Z<0.8$.

Polysiloxanes of the formula (II) which contain (meth)acrylate radicals can be for example: γ-Methacryloxy-propyl-trimethoxysilane (MEMO):

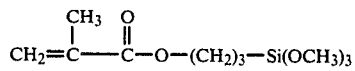

and also derivatives thereof, such as, for example, γ-methacryloxypropyl-tris(trimethylsiloxy)silane (TRIS):

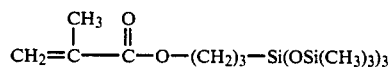

and 1,3-bis(γ-methacryloxypropyl)-1,1,3,3-tetra(trimethylsiloxy)disiloxane (TETRA) (DE-A 3,244,877):

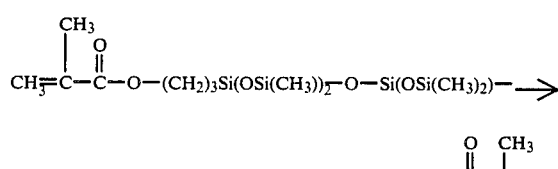

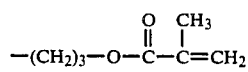

and hydrolysis products of the reaction of γ-methacryloxypropyl-trimethoxysilane with dichlorodimethylsilane and chlorotrimethylsilane (DE-A 3,329,722).

Further polysiloxanes of the formula (II) containing (meth)acrylate radicals are known from the U.S. Pat. No. 4,216,303, U.S. Pat. No. 4,303,772, DE-A 3,002,683, WO 82/00352 and EP-A 108,886; (M. A. Al-Issa et al., Europ. Polym. J., Vol. 20, No. 10, pp. 947 to 950 (1984); T. F. Blahorici et al., Polym. Eng. and Sci., Vol. 22, No. 17, pp. 1123 to 1126 (1982).

Examples hereof which may be mentioned are: γ-methacryloxypropylpentamethyldisiloxane:

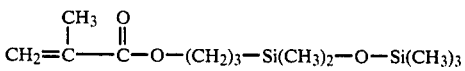

and γ-methacryloxypropyl-dimethyl(nonamethyltetrasiloxane)silane:

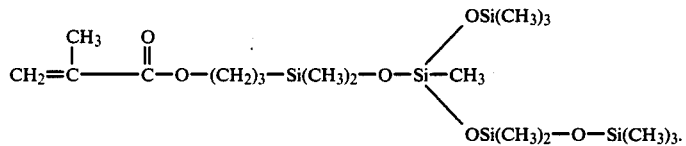

Polysiloxanes of the formula (III) containing methacrylate radicals are, for example, the reaction products of β-allyloxyethylmethacrylate with SiH-group-containing polysiloxanes (EP-A 130,731).

For compounds of the formula (IV), examples which may be mentioned are silicon (meth)acrylate polymers (macromers) which may be prepared by reaction of hydroxylalkyl-terminated polysiloxanes, such as, for example, polydimethylsiloxanetriol, with 1-isocyanatomethyl-5-isocyanato-1,3,3-trimethylcyclohexane and β-hydroxyethyl (meth)acrylate. The (meth)acrylate radical is linked to the polysiloxane radical via urethane, thiourethane, urea or amide functions. This group of compounds is known from E. Gorden Cameron and M. S. Chisholm, Polymer, 1985, Vol. 26, No. 3, pp. 437 to 442; U.S. Pat. No. 4,136,250 and EP-A 109,355.

The (meth)acrylates of a polymethylsiloxane of the formula (V) may be prepared by reaction of isocyanatoethyl (meth)acrylate with hydroxyalkyl or aminoalkyl-terminated polydimethylsiloxanes or octamethylcyclotetrasiloxanes (EP-A 127,321; X. Yu, H. R. Nagarajan et al., J. of Applied Polym. Sci. 30, pp. 2115–2135 (1985)).

The polymerization is carried out at temperatures of 20° to 120° C. by means of initiators which decompose into radicals. The polymerization can be initiated by heat or by light. The initiators are azo compounds, such as azoisobutyric acid dinitrile, or peroxides, such as tert.-butylpercarboxylic acid esters, or light initiators such as, for example, benzoin isobutyl ether, which decompose into radicals (H. J. Hagemann, Progress in Org. Coatings, 13, pp. 123 to 150 (1985)).

It is also possible to use mixtures of (meth)acrylates of a polysiloxane according to the invention.

The optical contact objects according to the invention generally contain 30 to 96 parts by weight, preferably 35 to 85 parts by weight, of a (meth)acrylate of a polysiloxane.

The products of the reaction of γ-methacryloxypropyltrimethoxysilane with dimethyldichlorosilane and trimethylmonochlorosilane according to EP-A 122,061, γ-methacryloxypropyl-tris(trimethylsiloxy)silane, 1,3-bis(γ-methacryloxypropyl)-1,1,3,3-tetra(trimethylsiloxy)disiloxane and the products of the reaction of isocyanatoethyl methacrylate with hydroxyalkyl-terminated, branched or cyclic polysiloxanes (EP-A 127,321) are particularly preferred as (meth)acrylates of a polysiloxane.

The optical contact objects according ot the invention may, if appropriate, contain a vinyl monomer as component (C). Preferred vinyl monomers are, for example, N-vinyllactam and methacrylic acid derivatives.

N-vinylpyrrolidone may be mentioned as an example of the N-vinylactams; and methacrylic acid, methacrylic amide, ($C_1$ to $C_{12}$)-alkyl methacrylates, monooxy- or dioxy-($C_2$ to $C_6$)-alkyl methacrylates and glycidyl methacrylates may be mentioned as examples of methacrylic acid derivatives. It is also possible to use mixtures of vinyl-monomers according to the invention.

The optical contact objects according to the invention generally contain up to 66 parts by weight, preferably 10 to 60 parts by weight, of a vinyl monomer (C).

A process has been found for the production of optical contact objects which is characterized in that (A) 4 to 55 parts by weight of an N-vinylcarboxamide of the formula $$R^1-\underset{\underset{O}{\|}}{C}-\underset{\underset{R^2}{|}}{N}-CH=CH_2 \quad (I)$$

in which $R^1$ and $R^2$ are identical or different and denote hydrogen or lower alkyl, (B) 96 to 30 parts by weight of a (meth)acrylate or (meth)acrylates of a polysiloxane, and, optionally, (C) up to 66 parts by weight of a vinyl monomer, are polymerized in the presence of a radical initiator.

Peroxides, such as, for example, dibenzyl peroxide and dilauryl peroxide, or azo compounds, such as, for example, azoisobutyric dinitrile, may be used, for example, as radical initiators. Of course, it is also possible to initate the polymerization by means of light.

The polymerization here may be carried out by means of so-called bulk polymerization in plate chambers, glass or plastic tubes or plastic dishes.

A preferred embodiment of the process according to the invention is the polymerization of the components in plastic dishes made of polyolefin, such as, for example, polyethylene, polypropylene, polymethylpent-1-ene, polyamides or polyacetals. The dishes may have an appropriate shape for a blank of the optical contact objects, for example for the finished lenses.

The polymerization may also be carried out with addition of solvents such as ethylene glycol, water or ethanol. The solvents may, if appropriate, later be washed out using water.

The copolymers may be crosslinked during or after the polymerization.

The crosslinking may be caused in a fashion which is known per se, for example by the action of high-energy irradiation, for example electron beams, on the prepared copolymer or by concomitant use of 0.01 to 6% by weight, preferably 0.1 to 5% by weight, and particularly preferably 0.2 to 1% by weight, of crosslinking agents having at least two olefinically unsaturated groups during the copolymerization.

Suitable crosslinking agents may be, for example, (meth)acrylate crosslinking agents and/or vinyl or allyl crosslinking agents.

The (meth)acrylate crosslinking agents which contain, besides a (meth)acrylate group, at least one further identical or different olefinically unsaturated group are known per se. These include acrylates or methacrylates of polyfunctional alcohols, such as, for example, ethylene glycol dimethylacrylate, propylene glycol dimethacrylate, diethylene glycol dimethacrylate, triethylene glycol dimethacrylate, polyethylene glycol dimethacrylate, 1,4-butanediol dimethacrylate, 1,6-hexanediol dimethacrylate, trimethylolpropane trimethacrylate, pentaerythritol trimethacrylate and tetramethacrylate, methyl-1,5-pentanediol dimethacrylate, dihydrodicyclopentanedienyl monomethacrylate, allyl methacrylate, vinyl methacrylate and bisphenol A dimethacrylate. Of course, the corresponding acrylates, for example the methyl or ethyl esters, may also be employed.

Vinyl or allyl crosslinking agents are characterized by the vinyl or allyl group. Examples of such monomers which are known per se are butanediol divinyl ethers, divinylethylene urea, divinylpropylene urea, divinyl adipate, divinylbenzene, divinyl phthalate, triallyl cyanurate, triallyl isocyanurate, diethylene glycol diallyl carbonate, diallyl maleate, diallyl itaconate, trimethylolpropane diallyl and triallyl ether, triallyl trimellitate and N,N-diallyl melamine.

In the copolymerization, both the (meth)acrylate crosslinking agents and the vinyl or allyl crosslinking agents are preferably employed in a weight ratio of 0.1:3 to 3:0.1, preferably 0.1:2, particularly preferably about 0.1:1. Optical contact objects having high transparency and radial stability are advantageously obtained by means of the mentioned combination of the two types of crosslinking agent. The materials thus obtained contain virtually no components which can be extracted using water.

The copolymers are generally formed randomly and may have the structure of interpenetrated networks.

Depending on the type of the polysiloxane (meth)acrylic monomers, the glass transition temperatures are in the range from −80° to +100° C. Straight-chain polysiloxane radicals yield polymers having a lower glass transition temperature and, accordingly, soft, rubber-elastic optical contact objects.

(Meth)acrylic acid derivatives having branched polysiloxane radicals yield polymers having a higher glass transition temperature and accordingly semi-hard to hard optical contact objects.

Depending on the proportion of hydrophilic monomer units in the copolymer, the water absorption capacity of the latter may be varied within broad limits, for example in the range from 2 to 70% by weight, relative to the hydrated state. Compared to conventional soft lenses, the lenses prepared according to the invention have the advantage that they can be adjusted to have a lower water absorption capacity and still have the required wear comfort on the eye of a soft lens having a correspondingly higher oxygen permeability.

The material to be used according to the invention is excellently suited for the production of thin to very thin VT lenses. As a result of the low water absorption, only a slight increase in thickness occurs during hydration. Thin to very thin lenses are taken to mean lenses having a central thickness of 0.04 to 0.15 mm in the case of design for negative lenses (for correction of short-sightedness), 0.08 to 0.4 mm in the case of positive lenses (for correction of long-sightedness) and 0.1 to 0.4 mm in the case of aphakia lenses (for correction of aphakia). An increased exchange of tear fluid can be caused by appropriate internal geometry (aspherical construction) and the tolerability on the eye can thus be increased.

The thin to very thin lenses have an increased oxygen permeability compared to conventional lenses having a central thickness of more than 0.15 mm, which proves to be an advantage, particularly in the case of extended wearing of contact lenses.

A particular advantage of the optical contact objects according to the invention is the good wettability, which is also retained after wearing for many years. Conventional optical contact objects, particularly lenses based on polysilicon methacrylate, lose their wettability after wearing for several months, and the surface must subsequently be treated. The material properties of the highly gas-permeable polymer are retained by the reduction of deposits on the surface of the optical contact objects. Interferences with vision and retention on the eye are avoided as well as the possible development of allergies when intensive cleaners are frequently used. The optical contact objects according to the invention do not require surface treatment, such as, for example, corona or plasma treatment, to improve the tolerability.

EXAMPLES

Example 1

Preparation of methacrylates of polymethylsiloxanes (a) polydimethylsiloxane methacrylate was prepared by hydrolysis and equilibration of 0.316 mole of γ-methacryloxypropyltrimethoxysilane (MEMO), 2.528 moles of dimethyldichlorosilane and 0.316 mole of trimethylmonochlorosilane in 600 ml of a 1:1 methanol:water mixture at 45° C. According to the silicon analysis, the monomer consisted of 90 mole % of polydimethylsiloxane.

(b) γ-Methacryloxypropyl-tris (trimethylsiloxy)silane (TRIS) was prepared by hydrolysis of 0.1 mole of γ-methacryloxypropyl-trimethoxysilane (MEMO) and 0.35 mole of chlorotrimethylsilane and subsequent distillation following the same procedure as in Example (a).

(c) 1.3-Bis(γ-methacryloxypropyl)-1,1,3,3-tetra(-trimethylsiloxy)disiloxane (TETRA) was prepared following the same procedure as in Example (b) with 0.1 mole of γ-methacryloxypropyltrimethoxysilane (MEMO) and 0.2 mole of chlorotrimethylsilane.

(d) Urethanepolydimethylsiloxane methacrylate was prepared by reacting 2-isocyanatoethyl methacrylate with a branched, OH-group-containing polydimethylsiloxane alkanol which has a molecular weight of 250 and a terminal hydroxypropyl group, in a molar ratio of 1:1 and in the presence of 0.15 mole-% of dibutyl tin laurate at 70° C. over a period of 6 hours in methylene chloride and the volatile constituents were stripped off in vacuo in a rotary evaporator at 80° C.

EXAMPLES 2 TO 5

Monomer mixtures of the compositions listed in Table 1 below were transferred to cylindrical dishes made of polypropylene with diameter 12 mm and height 10 mm with the exclusion of air, and provided with a stamp. The filled moulds were irradiated for 3 days with UV fluorescence light at 40° C., removed from the moulds and subsequently treated in a drying cabinet for 12 hours at 80° C. and then 12 hours at 120° C. Contact lenses were produced from the blanks by means of lathe cutting and polishing.

TABLE 1

| Composition in parts by weight | Examples | | | | | |
|---|---|---|---|---|---|---|
|  | 2 | 3 | 4 | 5 | 6 | 7 |
| N—methyl-N—vinyl-acetamide | 5 | 10 | 7 | 7 | 5 | 5 |
| Methyl methacrylate | 25 | 25 | 25 | 25 | 35 | 55 |
| MEMO | 70 | — | — | — | — | — |
| Polysiloxane methacrylates (Example a) | — | 65 | 68 | — | — | — |
| TRIS | — | — | — | — | 60 | 30 |
| TETRA | — | — | — | — | — | 10 |

TABLE 1-continued

| Composition in parts by weight | Examples | | | | | |
|---|---|---|---|---|---|---|
| | 2 | 3 | 4 | 5 | 6 | 7 |
| Urethanepolydimethyl-siloxane methacrylat (Example d) | — | — | — | 68 | — | — |
| Ethylene glycol dimethacrylate | 0.5 | 0.5 | 0.5 | 0.5 | 1.0 | — |
| Triallyl cyanurate | 1.0 | 1.0 | 1.0 | 1.0 | 1.4 | — |
| Azodiisobutyric dinitrile | 0.05 | 0.05 | 0.05 | 0.05 | 0.05 | 0.05 |

EXAMPLE 6

The lenses produced by Examples 2 to 7 were dialysed for 6 days with ion exchanger water and conditioned in 1% strength sodium chloride solution. The water absorption capacity is given in Table 2 below:

TABLE 2

| Water absorption capacity in % by weight, relative to the moist state | | | | | |
|---|---|---|---|---|---|
| Lenses according to Example | | | | | |
| 2 | 3 | 4 | 5 | 6 | 7 |
| Water absorption capacity: 3 | 6 | 5 | 5 | 2 | 2 |

EXAMPLE 7

The animal experiment on the rabbit eye produced no cases of inflammation after uninterrupted wear for 30 days. The lenses were free of any deposits. The lenses produced according to Examples 2 to 7 were worn daily for 5 to 8 hours for 6 months by test persons in a right/left comparison with commercially available silicon methacrylate lenses. After 6 months, there was no reduction in wettability. Scanning electron microscope pictures of the lens surfaces show no deposits and no microcrack formation on the surface. In contrast, the commercially available silicon methacrylate lenses showed the commencement of microcrack formation and a reduction in the wettability, which became noticeable due to a decrease in the subjective tolerability.

What is claimed is:

1. Optical contact objects fabricated from wettable, optionally crosslinked copolymers of olefinically unsaturated monomers, wherein the copolymer contains as components
   (A) 4 to 55 parts by weight of an N-vinylcarboxamide of the formula $$R^1-\overset{O}{\overset{\|}{C}}-\overset{R^2}{\overset{|}{N}}-CH=CH_2$$

in which $R^1$ and $R^2$ are the same or different and denote hydrogen or lower alkyl,
   (B) 96 to 30 parts by weight of a (meth)acrylate of a polysiloxane, and, optionally
   (C) up to 66 parts by weight of a vinyl monomer.

2. Optical contact objects according to claim 1, wherein 5 to 15 parts by weight of the N-vinylcarboxamide are used.

3. Optical contact objects according to claims 1 and 2, wherein N-methyl-N-vinylacetamide is used as the N-vinylcarboxamide.

4. Optical contact objects according to claims 1 to 3, wherein 85 to 35 parts by weight of a (meth)acrylate of a polysiloxane are used.

5. Optical contact objects according to claims 1 to 4, wherein a (meth)acrylate of a polysiloxane of the formula $$CH_2=\overset{R^3}{\overset{|}{C}}-\overset{O}{\overset{\|}{C}}-O-(CH_2)_n-\overset{R^4}{\overset{|}{\underset{|}{Si}}}-R^6$$
$$R^5$$

wherein
n represents a number from 1 to 4,
$R^1$ denotes hydrogen or methyl, and
$R^4$, $R^5$ and $R^6$ are the same or different and denote alkoxyl, lower alkyl, cycloalkyl, aryl, trimethylsiloxyl or polysiloxane, is used.

6. Optical contact objects according to claims 1 to 4, wherein a (meth)acrylate of a polysiloxane of the formula $$CH_2=\overset{R^3}{\overset{|}{C}}-\overset{O}{\overset{\|}{C}}-O-(CH_2)_n-O-(CH_2)_m-Si(OR^7)_3,$$

wherein
n and m are identical or different and each represent a number from 1 to 3, and
$R^3$ denotes hydrogen or methyl and
$R^7$ denotes lower alkyl, cycloalkyl or polysiloxane, is used.

7. Optical contact objects according to claims 1 to 4, wherein a (meth)acrylate of a polysiloxane of the formula $$CH_2=\overset{R^3}{\overset{|}{C}}-\overset{O}{\overset{\|}{C}}-O-(CHR^8)_n-X-\overset{O}{\overset{\|}{C}}-NH-Y-NH-\overset{O}{\overset{\|}{C}}-O-(CH_2)_n-R^9$$

wherein
n represents a number from 1 to 4,
$R^3$ denotes hydrogen or methyl,
$R^8$ denotes hydrogen, lower akyl or hydroxyl,
$R^9$ represents polysiloxane,
X denotes oxygen, sulphur or the radical $$-\overset{R^8}{\overset{|}{N}}-$$

wherein
$R^8$ has the meaning given above, and
Y represents a divalent $C_2$-tp $C_{24}$-alkylene, $C_5$- to $C_8$-alkylene, or a divalent radical having 7 to 20 carbon atoms consisting of alkylene, cycloalkylene and/or arylene groups,
is used.

8. Optical contact objects according to claims 1 to 4, wherein a (meth)acrylate of a polysiloxane of the formula

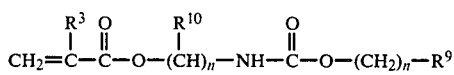

wherein n represents a number from 1 to 6, $R^3$ denotes hydrogen or methyl, $R^9$ represents siloxane, and $R^{10}$ denotes hydrogen, lower alkyl or cycloalkyl, is used.

9. Optical contact objects according to claims 1 to 8, wherein 10 to 60 parts by weight of a vinyl monomer are used.

10. Optical contact objects according to claims 1 to 9, wherein an N-vinyllactam and/or a (meth)acrylic acid derivative is used as the vinyl monomer.

11. Process for the preparation of optical contact objects, wherein (A) 4 to 55 parts by weight of an N-vinylcarboxamide of the formula

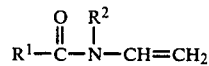

wherein $R^1$ and $R^2$ are the same or different and denote hydrogen or lower alkyl, (B) 96 to 30 parts by weight of a (meth)acrylate or (meth)acrylates of a polysiloxane, and optionally, (C) up to 66 parts by weight of a vinyl monomer are polymerized in the presence of a radical initiator.

12. Use of wettable, optionally crosslinked copolymers containing as components (A) 4 to 55 parts by weight of an N-vinylcarboxamide of the formula $$R^1-\overset{O}{\overset{\|}{C}}-\overset{R^2}{\overset{|}{N}}-CH=CH_2$$

wherein $R^1$ and $R^2$ are the same or different and denote hydrogen or lower alkyl, (B) 96 to 30 parts by weight of a (meth)acrylate or (meth)acrylates of a polysiloxane, and, optionally, (C) up to 66 parts by weight of a vinyl monomer for optical contact objects.

13. Use according to claim 12 for contact lenses or scleral lenses.

* * * * *

UNITED STATES PATENT AND TRADEMARK OFFICE
CERTIFICATE OF CORRECTION

PATENT NO. : 4,703,097
DATED : October 27, 1987
INVENTOR(S) : Wingler et al

It is certified that error appears in the above-identified patent and that said Letters Patent is hereby corrected as shown below:

Column 1, line 32, change "losse" to read --lose--;

Column 2, line 21, change the chemical formula to read:

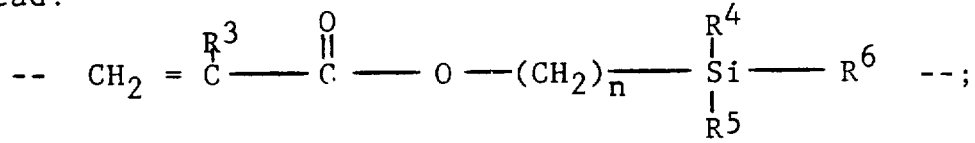

Column 4, lines 40-45, change the chemical formula preceding the arrow to read:

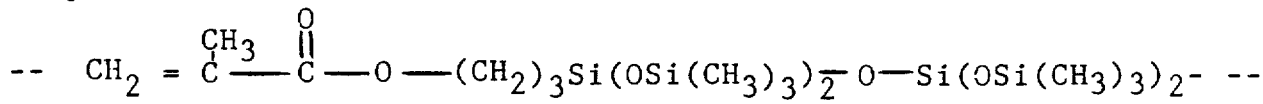

Column 4, last line, change "rasiloxane)silane:" to read --rasiloxanyl)silane:--.

Signed and Sealed this

Twenty-fourth Day of May, 1988

Attest:

DONALD J. QUIGG

Attesting Officer

Commissioner of Patents and Trademarks